No. 82,570. G. VAN SICKLE. DEVICE FOR UNLOADING HAY. PATENTED SEPT. 29, 1868.
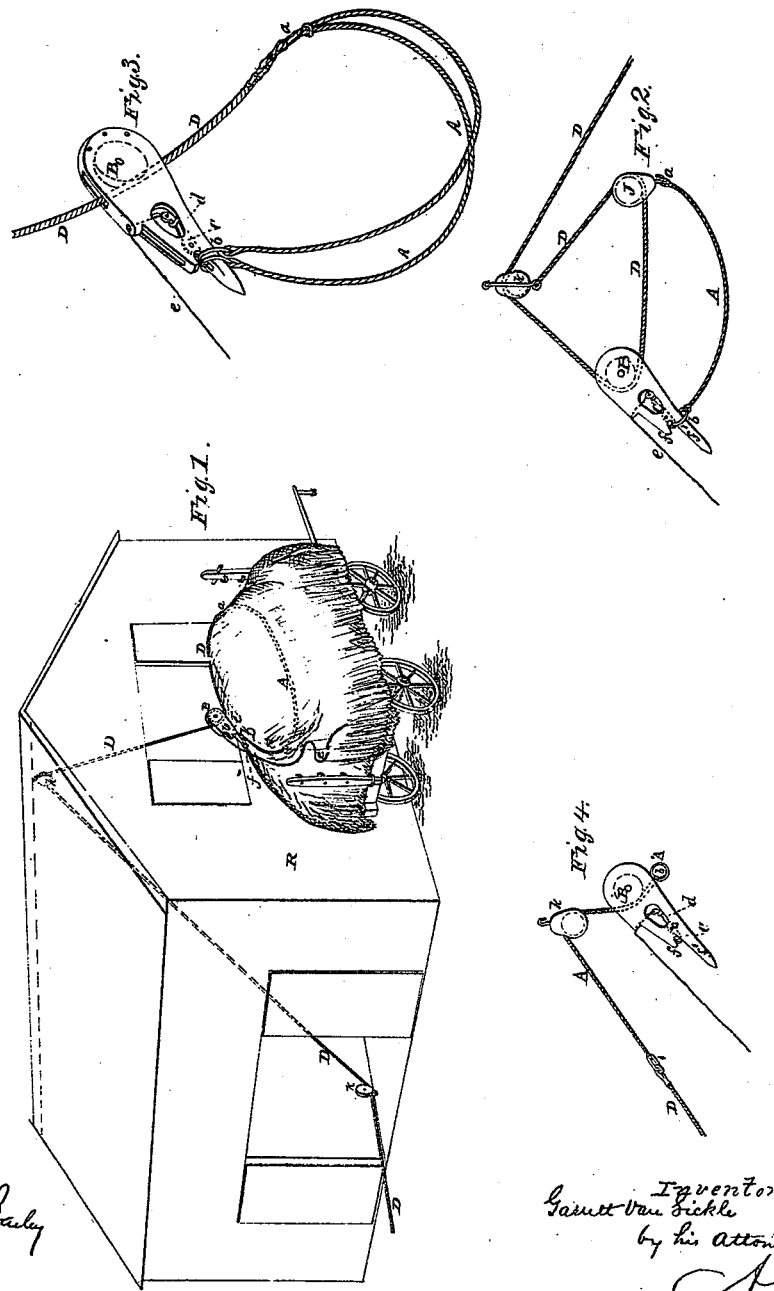

UNITED STATES PATENT OFFICE.

GARRETT VAN SICKLE, OF AUBURN, NEW YORK.

IMPROVED DEVICE FOR UNLOADING HAY.

Specification forming part of Letters Patent No. 82,570, dated September 29, 1868.

*To all whom it may concern:*

Be it known that I, GARRETT VAN SICKLE, of Auburn, in the county of Cayuga and State of New York, have invented certain new and useful Improvements in Apparatus for Elevating and Discharging Hay, &c.; and I hereby declare the following to be a full, clear, and exact description of the same, reference being had to the accompanying drawings, in which—

Figure 1 represents the method of using my improved apparatus. Figs. 2, 3, and 4 represent the apparatus in the different positions assumed by it during the operation of unloading and discharging the hay.

The object of my invention is to facilitate the unloading and discharging of hay, &c., from the wagon into the barn or other place in which it is to be stored.

The ordinary method of unloading the hay— that is to say, by means of pitchforks or by the larger horse hay-forks now in general use— is defective in important respects, for not only does the operation, when thus conducted, consume much time, but a considerable portion of the hay drops from the forks and is scattered on the ground, whence it must be regathered and pitched into the mow. Under my invention all the labor of pitching the hay is avoided, and at the same time there is little or no waste, no matter what may be the length of the hay, while the operation of unloading and discharging can be accomplished with the utmost dispatch. To effect these results I use a rope or other suitable binding device, which is combined with an elevating and discharging apparatus in such manner that when the apparatus is in operation the hay or other material placed upon the rope or other binding device will be first drawn into the form of a compact bundle, and then elevated or raised from the body of the wagon, whence it can be swung over the mow or other place where it is to be deposited. Then by pulling upon the discharging-cord of the apparatus the binding-rope will be unlocked or unfastened from around the bundle of hay, which falls into the mow. By this means all the hay in the wagon can be removed expeditiously and quickly. There are two, three, or more of the binding-ropes used, according to the quantity of hay carried by the wagon. When the wagon is to be loaded one of the binding-ropes is placed on the wagon-bed, and upon it the hay is thrown. When it is judged that a sufficient quantity has been thrown in, another binding-rope is laid down on top of the hay already in the wagon, and so on until the loading is completed, after which the wagon is driven to the barn or other place of deposit of the hay, where the elevating and discharging apparatus is also located. This apparatus operates the topmost binding-rope and elevates and discharges the topmost layer, so to speak, of the hay in the wagon. It is then engaged with the binding-rope next beneath, when the same operation is performed, the unloading and discharging of the hay being thus completed in a very short time.

Having indicated the general features of my invention, I will now proceed to describe the manner in which the same is or may be carried into effect by reference to the accompanying drawings.

The apparatus used by me consists of the following parts: first, a binding-rope, or equivalent device, A; second, a block containing the pulley B, around which passes the elevating-rope connected to one end of the binding-rope A, and the hook C, by which the other end of the binding-rope is held, the said hook being so arranged as to release at any desired moment the said rope; third, the elevating-rope D, by which the hay is raised from the wagon and brought over the place where it is to be deposited.

The binding device A may be of any suitable length, and may consist of one or more ropes, according to the length of the hay, one rope being all that is needed when the hay is of the usual length. Upon one end of the binding device is a link, *a*, and upon the other one or more rings, *b*, according to the number of ropes employed.

The pulley and hook block I prefer to make in the form shown in Fig. 3. In the upper part of the block is mounted a pulley, B, in any ordinary or suitable manner. The block tapers toward its lower end, which is forked and slotted, as indicated at *d d* in the figure referred to, to receive a vibratory hook or catch, C, pivoted at *c* to the block. The upper end of the catch has attached to it a cord, *e*, which passes out through a hole in the block, and is used to draw back the hook. The lower end of the catch, which constitutes the hook, extends outside of the body of the block, and lies between the forks or arms $f f'$ on its lower end. The longer arm, $f'$, is pivoted, as shown in the drawings, for the purpose hereinafter referred to. The catch C lies partly in a recess formed in the block, and its upper end is drawn back by means of a spring, $g$, so as to throw out the hook on its lower end.

On the end of the elevating-rope D, which meets the binding-rope A, is a snap-hook, which is intended to engage with the link $a$ of the binding device. The elevating-rope passes over a series of pulleys, $k\ k$, placed in the barn or other place where the hay is to be deposited, as indicated in Fig. 1. This rope and the pulley and hook block are only used when the hay is to be discharged, and need not accompany the wagon to be loaded.

The following is the manner in which the apparatus described may be used for the purpose hereinbefore referred to.

When it is desired to load the wagon E, for instance, with hay which is to be discharged at a certain place, before any hay is thrown in, one of the binding ropes or devices A is laid upon the bed of the wagon and the rings or links on its ends caught upon hooks $m$ in uprights $n$, attached by suitable means to the front and rear of the wagon, the object of this being to hold the rings in such position that they can be readily attached to the elevating and discharging devices at the proper time. Hay is then loaded into the wagon in the usual manner, and when it is judged that a quantity sufficient for the binding-rope to hold has been thrown in another binding device, A, is placed on top of the hay already in the wagon, its rings $a\ b$ being caught, in the manner already described, upon a second set of hooks, $m'\ m'$, placed above the first. Hay is now thrown in upon this binding device, and the operation thus progresses until the loading is completed, the hay being divided into layers by the binding-ropes. The wagon is now driven to the barn R, where the load is to be deposited. The snap-hook end of the elevating-rope D, which has been previously passed through the pulley-block and around the pulley B, is attached to one end of the binding-rope A. The lower end or pointed arm $f'$ of the pulley-block is inserted through the ring or rings on the opposite end of the binding device until they engage with the hook or catch C, and the topmost layer of hay is thus completely encircled, partly by the binding device and partly by the lower end of the elevating-rope, as shown in Fig. 1. By pulling on the lower end of the rope D this rope will be drawn over the pulley B until the hay is first compressed into a compact bundle, and then elevated or raised bodily from the wagon, whence it can be swung over the mow or other place where it is to be dropped. As soon as it has reached this position the snap or unlocking cord is pulled so as to draw forward the upper arm of the lever-catch, C. The lower arm or hook of the lever is thus drawn back, releasing the rings $b$, which slide off from the end $f'$ of the pulley-block, release the end of the binding-rope, and discharge the hay. The position of the devices when the hay is held in an elevated position is shown in Fig. 3. The position after the discharge of the hay is shown in Fig. 4. After this has been done the elevating-rope is detached from the binding device and is applied to the one next in order on the wagon. Another layer of hay is removed in the same manner, and the operation is repeated until all the hay has been unloaded.

In Fig. 2 I have shown a modification of the apparatus, the end $a$ of the binding device being attached to a pulley, J, carried by the elevating-rope, instead of being connected directly to the elevating-rope. It is manifest, however, that the arrangement of the pulleys and elevating-rope can be varied in many ways, which need not be here specified.

The apparatus above described can, of course, be used not only to elevate and discharge hay, but in any other connection where an elevating apparatus may be required. It will also be understood that the construction of the pulley and hook for holding the binding device can be varied in many respects without departing from the principle of my invention.

I do not claim, broadly, the method of elevating materials by means of binding-ropes placed under the material and connected with an elevating block and tackle and a discharging device; but,

Having now described my invention and the manner in which the same is or may be carried into effect, what I claim, and desire to secure by Letters Patent, is—

1. The combination and arrangement of the binding rope or device with the elevating-rope and the combined pulley and hook and its tripping-cord, in the manner herein described, whereby the hay or other like material, whatever may be its quantity, is first drawn and compressed into a compact bundle and then elevated and discharged, as herein shown and set forth.

2. The combination, with the body of the hay-wagon, of uprights $n$ and their hooks for holding and maintaining in position the hay-binding ropes, substantially as herein shown and set forth.

3. A combined pulley and hook constructed as herein specified, and shown in the accompanying drawings.

In testimony whereof I have signed my name to this specification before two subscribing witnesses.

GARRETT VAN SICKLE.

Witnesses:
MARCELLUS BAILEY,
EDM. F. BROWN.